United States Patent Office 3,536,676
Patented Oct. 27, 1970

3,536,676
POLYMERS OF ALKYLENE DIPEROXYESTERS
Orville Leonard Mageli, Buffalo, Rupert Edwin Light, Jr., Williamsville, and Ronald Bartholomew Gallagher, Buffalo, N.Y., assignors to Pennwalt Corporation, East Orange, N.J., a corporation of Pennsylvania
No Drawing. Filed Mar. 17, 1967, Ser. No. 623,822
Int. Cl. C08f 15/24, 15/40, 29/48
U.S. Cl. 260—78.5                          16 Claims

ABSTRACT OF THE DISCLOSURE

Copolymers of alkylene diperoxyesters and ethylenically unsaturated monomers, such as styrene and butadiene, having pendant peroxyester groups. These are produced by copolymerization of the alkylene diperoxyester and the other monomer between about —60° C. and about +80° C. Example: Vinyl chloride and di(t-butylperoxy) fumarate were suspension copolymerized at 50° C. for 16 hours, using a monoperoxy ester initiator, to obtain a copolymer having 3.72% active oxygen. These are initiators for vinyl polymerization.

BACKGROUND OF THE INVENTION

This invention relates to homopolymers, copolymers and graft-copolymers of certain alkylene diperoxyesters; to processes of making these polymers; to polymerization and curing processes using the homopolymers or copolymers as free radical affording initiators; and to a process for stabilizing mixed polymers by adding graft-copolymer thereto.

Uno and Yoshida in Chemistry of High Polymers, vol. 17, No. 179 (1966) pp. 183–186 report on the preparation of copolymers of vinyl chloride and t-butylperoxy-crotonate having pendant peroxy groups and the use of these copolymers to form a graft-copolymer with styrene.

British specification No. 1,041,088, published Sept. 1, 1966, disclosed linear copolymers of ethylenic monomers and an alkylene monoperoxyester. An example is given of copolymerizing methylmethacrylate and t-butyl-peroxy(monobutyl fumarate).

German Pat. No. 1,055,240 granted Feb. 15, 1962 discloses copolymerization between an alkylene peroxide, such as fumaroyl peroxide, and vinyl monomers, such as methylmethacrylate. The copolymer can be grafted using a vinyl monomer such as styrene.

U.S. Pat. No. 3,288,739, granted Nov. 29, 1966, shows the introduction of peroxidic groups into amorphous polyethylene by the action of free oxygen and also grafting a monomer at the peroxidic sites.

U.S. Pat. No. 3,291,859, granted Dec. 13, 1966, discloses the use of dual functional peroxidic compounds such as succinic acid peroxide as initiators in the formation of block polymers.

SUMMARY, DESCRIPTION AND EXAMPLES (1) Preparation of homopolymers and the homopolymers (a) The homopolymerization process of the invention comprises heating a peroxyester monomer I at a polymerizing temperature between about —30° C. and about +80° C. for a time sufficient to produce a homopolymer characterized by the presence of pendant peroxyester groups, desirably pairs of adjacent pendant peroxyester groups.

(b) The homopolymers of the invention are the product of the homopolymerization invention.

The peroxyester monomer I has the general formula:

(I)         P—(R$_1$)$_n$—[A]—(R$_2$)$_m$—P where (a) [A] is the radical [—CH=CH—] or

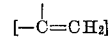

(b) P is the radical

or

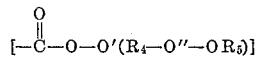

(c) $m$ and $n$ are zero or 1;
(d) R$_1$ and R$_2$ are alkylene radicals having 1–6 carbon atoms;
(e) R$_3$ is the radical lower t-alkyl, cycloalkyl at a t-carbon atom, cycloalkyl-lower-t-alkyl, or ar-lower-t-alkyl;
(f) R$_4$ is a radical having a t-carbon atom joined to peroxy oxygen O' and a t-carbon atom joined to peroxy oxygen O'', said radical R$_4$ being alkylene, alkenylene, or alkynylene having 3–12 carbon atoms;
(g) R$_5$ is the radical H, lower t-alkyl, ar-lower t-alkyl, lower acyl, and lower carbonate.

The term "lower-t-alkyl" is intended to include from 4 to about 12 carbon atoms. Illustrative of a "cycloalkyl at a t-carbon atom" is

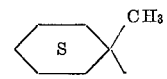

Illustrative of a t-carbon atom is

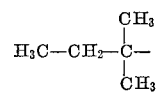

"Alkylene" is illustrated by —CH$_2$—CH$_2$—. "Alkenylene" is illustrated by —CH=CH—. "Alkynylene" is illustrated by —C≡C—. "Lower acyl" is intended to include from 1 to about 8 carbon atoms. "Lower carbonate" is intended to include from 1 to about 8 carbon atoms and all the isometric carbonate structures.

Illustrative monomers are di(t-butylperoxy) fumarate; di(t - butylperoxy) mesaconate; di(t - butylperoxy)itaconate; and di(cumylperoxy)itaconate. The synthesis of these particular monomers is given by Yurzhenko and Fedorova, Zh. Organ. Kh., vol. 1, No. 4, pp. 688–691 (April 1965)—translation UDC 547.46-39. It is to be understood, this listing is not limiting.

It is preferred that the peroxyester monomer have at least one conjugated peroxyester group, i.e., the peroxyester is attached to one of the ethylenic carbon atoms, e.g.,

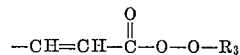

This situation is reached when $m$ or $n$ is equal to zero. (The word "zero" is used in order to avoid confusion with "O" for oxygen.)

Broadly the temperature range is between about —30° C. and about +80° C. The process is operated at a temperature such that substantial decomposition of the pendant peroxyester groups is avoided; this maximum is somewhat different for each monomer but lies within the broad range. Preferably the temperature range used is between about +30° C. and about +50° C.

The homopolymerization process is a free radical initiated one. The process may be carried out as a self-initiated polymerization or a free radical generating initiator may be added to the polymerization zone. Because self-initiation decreases the number of pendant peroxyester groups, in the homopolymer product, it is preferred to have an added free radical generating initiator present. The peroxidic free radical generators are preferred, e.g., t-butylperoxypivalate.

The homopolymerization may be a bulk polymerization; however it is preferred to carry out the polymerization in the presence of an inert liquid cooling medium. The cooling medium may be an inert organic liquid solvent for the monomer, i.e., conventional solution polymerization. Or the cooling medium may be an aqueous medium as is used in conventional emulsion, suspension or slurry polymerization.

It is to be understood that within the specified temperature range, the other conditions of the homopolymerization process of this invention are those applicable in any free radical initiated vinyl monomer polymerization process.

EXAMPLE 1

Homopolymerization of di(t-butylperoxy) fumarate

A solution polymerization was carried out at 40° C. using 50 pts. benzene, 50 pts. di(t-butylperoxy) fumarate (98%) and 0.20 pts. diisopropyl peroxydicarbonate (IPP). A 25.5 hour run resulted in a 11.5% conversion to homopolymer with an active oxygen content of 7.25%. A 2.4 hour run resulted in a 4.0% conversion to homopolymer with an active oxygen content of 8.14% and an intrinsic viscosity of 0.020 dl./g. The polymer containing 7.25% active oxygen was shock sensitive at 4" on the Bureau of Explosives Impact Test Apparatus. This compares to 3" to 4" for benzoyl peroxide. The theoretical active oxygen content is 12.3%.

(2) Preparation of copolymers and the copolymers (a) The copolymerization process of the invention comprises heating a peroxyester monomer I and an ethylenically unsaturated monomer capable of being polymerized by free radical initiation, at a temperature between about −60° C. and about +80° C. for a time sufficient to produce a copolymer characterized by pendant peroxyester groups, desirably pairs of adjacent pendant peroxyester groups.

(b) The copolymers of the invention are the product of the copolymerization process.

Throughout this specification peroxyester monomer I has the definition, including preferences, given in the description of the homopolymerization process.

Broadly the temperature range is between about −60° C. and about +80° C. The process is operated at a temperature such that substantial decomposition of the pendant peroxyester groups is avoided; this maximum is somewhat different for each monomer but lies within the broad range. Preferably the temperature range used is between about +30° C. and about +70° C.

The copolymerization process is a free radical initiated one. The process may be carried out as a self-initiated polymerization or a free radical generating initiator may be added to the polymerization zone. Because self-initiation decreases the number of pendant peroxyester groups in the homopolymer product, it is preferred to have an added free radical generating initiator present. The peroxidic free radical generators are preferred, e.g., t-butylperoxypivalate. The character of the copolymer is affected by the manner of initiation. A self-initiated polymerization produces copolymers having peroxyester terminal groups and these are suitable for subsequent formation of graft-block polymers. Using an added free radical initiator produces a copolymer which is especially suitable for the subsequent formation of graft polymers.

The copolymerization may be a bulk polymerization; however it is preferred to carry out the polymerization in the presence of an inert liquid cooling medium. The cooling medium may be an inert organic liquid solvent for the monomer, i.e., convention solution polymerization. Or the cooling medium may be an aqueous medium as is used in conventional emulsion, suspension or slurry polymerization.

It is to be understood that within the specified temperature range, the other conditions of the copolymerization process of this invention are those applicable in any free radical initiated vinyl monomer polymerization process.

In the copolymerization process, any ethylenically unsaturated monomer which is capable of being polymerized by free radical initiation may be used as the comonomer. Illustrative of these are: The vinyl-type monomers, e.g., styrenes, allylic monomers and acrylic monomers; the conjugated dienes, e.g., butadiene, isoprene, chloroprene and hexadiene. Examples of these are: vinyl esters, vinyl acetate and vinyl stearate; vinyl chloride, vinyl ethers; allyl phthalate, allylbenzene; esters of acrylic or methacrylic acid, acrylamide; acrylonitrile; styrene itself; divinylbenzene, alpha methyl styrene.

The relative amounts of peroxyester monomer and comonomer is determined by the active oxygen content desired in the copolymer. (It is to be understood that temperature and time in the copolymerization zone also affect the active oxygen content.)

EXAMPLE 2

Table A reports the results on copolymerization of several different comonomers and di(t-butylperoxy) fumarate using several different copolymerization techniques.

Materials.—di-(t-butylperoxy) fumarate was prepared by the method of Yurzhenko and Fedorova. The active oxygen content was 97.5% to 99.5% of the theoretical. All monomers were distilled except the instrument grade butadiene which was used without further purification. Styrene was treated with a dilute caustic solution and methyl methacrylate was treated with a salt-caustic solution before distillation. Vinyl chloride was given an additional treatment with a 5% NaOH solution.

Copolymerization of di(t-butylperoxy) fumarate with vinyl monomers

The styrene bulk copolymerizations were usually carried out in a 4-neck round bottom flask equipped with a condenser, thermometer, stirrer and nitrogen inlet.

The styrene solution copolymerization was carried out in benzene similar to the bulk copolymerization except that the di(t-butylperoxy) fumarate and initiator were added in increments throughout the reaction cycle.

The self-initiated styrene copolymerizations were carried out in sealed tubes.

The methyl methacrylate bulk, and the acrylonitrile water slurry copolymerizations were carried out by a procedure similar to the styrene bulk copolymerizations.

The vinyl acetate copolymerization was carried out in benzene in a side neck test tube using a nitrogen stream for agitation.

The butadiene emulsion and the vinyl chloride suspension copolymerizations were carried out in 24 oz. and 12 oz. beverage bottles, rotated end over end.

The polystyrene copolymers were purified by dissolving in benzene and precipitating with methanol. After three reprecipitations the copolymers were dried in a vacuum oven at room temperature. In cases where the molecular weights were very low the methanol was replaced with hexane or odorless mineral spirits.

Other copolymer systems were purified in a similar manner using solvents and precipitants applicable to the specific system.

A "control" consisting of a blend of one part of di(t-butylperoxy) fumarate and five parts of polystyrene was carried through the above purification process using methanol as the precipitant. The purified polystyrene contained 0.03% active oxygen.

Polystyrene alone carried through the same procedure contained 0.02% active oxygen.

TABLE A.—COPOLYMERS OF DI(T-BUTYLPEROXY) FUMARATE [1]

| Test number | Comonomer | Wt. ratio [2] | Type polymerization | Time, hrs. | Temp., °C. | Initiation system | Quantity initiator, phr. | Active O, percent | Intrinsic [11] viscosity |
|---|---|---|---|---|---|---|---|---|---|
| 1 | Styrene | 1:1 | Bulk | 9.5 | 50 | Lupersol 11 [7] | 2.0 | 5.31 | 0.032 |
| 2 | do | 1:3 | do | 12.0 | 50 | do | 1.5 | 2.00 | 0.127 |
| 3 | do | 1:5 | do | 12.0 | 50 | do | 0.5 | 1.95 | 0.088 |
| 4 | do | 1:5 | do | 12.0 | 50 | do | 0.5 | 1.94 | 0.059 |
| 5 | do | 1:5 | do | 16.0 | 70 | Self-initiated | | 0.66 | |
| 6 | do | 1:5 | do | 16.0 | 60 | do | | 1.10 | |
| 7 | do | 1:5 | Solution [3] [4] | 8.0 | 40 | IPP | 2.0 | 3.12 | 0.047 |
| 8 | Vinyl acetate | 1:5 | Solution [3] | 16.0 | 50 | Lupersol 11 | 0.1 | 2.04 | 0.315 |
| 9 | Vinyl chloride | 1:5 | Suspension | 16.0 | 50 | do | 0.05 | 3.72 | 0.265 |
| 10 | Butadiene | 1:5 | Emulsion [5] | 16.0 | 40 | $K_2S_2O_8$ [8] | 0.3 | 4.26 | 1.15 |
| 11 | do | 1:5 | do | 24.3 | 40 | $K_2S_2O_8$ [8] [9] | 0.3 | 2.57 | 1.36 |
| 12 | do | 1:3 | Emulsion [6] | 16.0 | 50 | D-215 [10] | 0.1 | 3.10 | |
| 13 | Acrylonitrile | 2:1 | Slurry | 4.5 | 40 | $K_2S_2O_8$ [8] | 0.45 | 1.1 | 1.15 |
| 14 | Methyl methacrylate | 1:2 | Bulk | 6.0 | 50 | Lupersol 11 | 0.67 | 0.32 | 0.358 |

[1] The conversion to polymer was in the range of 20% to 70%.
[2] Ratio of di(t-butylperoxy) fumate (DTBPF) to comonomer.
[3] The solvent was benzene.
[4] Both the DTBPF and initiator were added in increments throughout the reaction cylce.
[5] The emulsifier was Triton X-200 (Rohm and Haas).
[6] The emulsifier was Ivory Soap Flakes.
[7] Lupersol 11 is 75% t-butyl peroxypivalate in mineral spirits.
[8] Sodium bisulfite was used for the activation of potassium persulfate.
[9] Additional sodium bisulfite was added after 16 hrs.
[10] D-215 is 1,1,3,3-tetramethylbutyl hydroperoxide, which was activated with sodium formaldehyde sulfoxylate.
[11] Benzene was used as the solvent except in the case of the acrylonitrile copolymer where dimethylformamide was used and in the case of the vinyl chloride copolymer where cyclohexanone was used.

EXAMPLE 3

Styrene and bis(1,1,3,3-tetramethylbutylperoxy) fumarate were bulk copolymerized in a weight ratio of peroxyester to styrene of 1:5, at 50° C. for 11 hours using 1.0 phr. of Lupersol 11 initiator. About a 60% yield of copolymer was obtained; the copolymer had 0.36% of active oxygen and an intrinsic viscosity in benzene at 25° C. of 0.35.

EXAMPLE 4

Half-life determination of a styrene-di(t-butylperoxy) fumarate copolymer

The half-life of the styrene-di(t-butylperoxy) fumarate copolymer (Test No. 1) was determined to be 7.7 hours at 85° C. in a 0.196 molar benzene solution by the method of Mageli, Bukata, and Bolton. Bulletin 30.30, Lucidol Division, Wallace & Tiernan, Inc., Buffalo, N.Y.

The half-life of di(t-butylperoxy) fumarate was determined to be 5.5 hours in a 0.1 molar benzene solution.

EXAMPLE 5

Decomposition of styrene-di(t-butylperoxy) fumarate copolymer

The copolymer (Test No. 2) was heated in an excess of 1,1,2-trichloroethane for 24 hrs. at 100° C.

| Analysis | Original | Final |
|---|---|---|
| Intrinsic viscosity, dl./g | 0.127 | 0.115 |
| Active oxygen, percent | 2.00 | 0.16 |
| Chlorine | | 0.21 |

The original active oxygen content indicates one mole of active oxygen per 800 molecular weight. The final active oxygen content represents one active oxygen unit remaining per 10,000 molecular weight. The chlorine analysis indicates that one 1,1,2-trichloroethyl radical was incorporated on the polymer per 50,000 molecular weight or one chlorine atom per 1600 molecular weight.

(3) Graft and block copolymers and the preparation thereof and stabilization (a) The graft-polymerization process of the invention comprises heating at a graft polymerizing temperature between about +60° C. and about +100° C. (1) an ethylenically unsaturated monomer capable of being polymerized by free radical initiation and (2) a copolymer as defined in Summary 2, Preparation of copolymers and the copolymers, for a time sufficient to produce a graft copolymer.

When the defined copolymer was prepared by a self-initiated process, the grafting operation produces essentially only a combination graft and block copolymer product. When the defined copolymer was prepared by an added free radical generating initiator, the grafting operation produces essentially only a graft copolymer.

(b) The graft and graft-block copolymers of the invention are the products of the graft copolymerization.

(c) Dispersions of two different polymeric materials, solid state, liquid state, or "solutions" in solvents, are stabilized against undesired segregation by the presence of graft copolymer as defined in this Summary 3b.

The ethylenically unsaturated monomer used in the graft copolymerization process has the identical definition as that given for the "comonomer" in Summary 2, Preparation of copolymers and the copolymers.

Broadly the grafting operation is carried out at a temperature between about +60° C. and about +100° C. Commonly the temperature for vinyl-type monomers is between about +75° C. and about 90° C.

The grafting operation may be self-initiated or an added free radical generating initiator may be present, just as in the homo- and copolymerization processes.

The grafting operation may be carried out in anyone of the procedures usable for the homo- and copolymerization processes.

It is to be understood that the graft or graft-block copolymer products, as produced, include some by-product homopolymers of the grafting monomer.

EXAMPLE 6

Graft copolymer

One part by weight of the copolymer of vinyl acetate and di(t-butylperoxy) fumarate (Test No. 8) was allowed to react with two parts of styrene in bulk in sealed tubes for 18 hours at 85° C. The graft copolymer was dissolved in benzene and precipitated with hexane.

EXAMPLE 7

Graft-block copolymer

One part by weight of each of the self-initiated copolymers of styrene and di(t-butylperoxy) fumarate (Test Nos. 5 and 6) were reacted with two parts of methyl methacrylate in bulk in sealed tubes for 18 hrs. at 85° C. to give graft-block copolymers 7a and 7b respectively. The graft-block copolymers were dissolved in benzene and precipitated with methanol. Graft-block copolymer 7a had an intrinsic viscosity of 0.472.

EXAMPLE 8

Synthesis of ABS type resin using a copolymer of butadiene and di(t-butylperoxy) fumarate An emulsion copolymerization was carried out at 40° C. using 83.5 g. of 1,3-butadiene and 16.5 g. di(t-butylperoxy) fumarate and 300 g. water, in a manner similar to Test No. 10, Table A except that the reaction time was extended to 24.3 hrs. The conversion was 64.3% and the active oxygen was 2.57% and is included in Table A as Test No. 11.

The grafting reaction was carried out at 70° C. for 24 hrs. using 23 pts. of the above latex 54.5 pts. of styrene, 22.5 pts. of acrylonitrile and 100 pts. of water without the addition of more initiator or emulsifier.

EXAMPLE 9

Synthesis of ABS type resin using a terpolymer of styrene-acrylonitrile-di(t-butylperoxy) fumarate An emulsion terpolymerization was carried out at 40° C. for 6 hrs. in a 1-liter resin pot using 67 g. of styrene, 28 g. acrylonitrile, 5 g. of DTBPF and 300 g. of water. The conversion to terpolymer was 91.3%, the active oxygen content was 1.1% and the intrinsic viscosity was 0.23 dl./g.

The grafting reaction was carried out at 70° C. for 24 hrs. using 80 pts. of the terpolymer emulsion and 20 parts of butadiene without the addition of more initiator or emulsifier.

(3c) *Stabilization.*—It is known that when two different polymers are brought in solution—really a dispersion because of the low solubility of polymer in the common organic solvents—in a common solvent, over a period of time the solution segregates into two layers, having different polymeric compositions. Apparently homogeneous melts of two different polymers frequently on solidifying show undesired segregation or heterogeneous dispersion of one polymer throughout the continuous phase of the other polymer. Since physical mixtures (dispersion) of two different polymers afford very desirable physical properties, if a homogeneous mass is maintained, stability of the dispersion is of importance. A "third" component of the mix which improves the dispersion stability of the mix is known as a stabilizer—in certain special areas, the stabilizer is referred as a compatibility agent.

It has been discovered that the graft and graft-block copolymers of the invention are stabilizers.

The ability to stabilize is tested in the laboratory by empirical tests where the "stabilized" solution is compared to a control solution. The time for the appearance of two distinct layers is measured. It is to be emphasized that the results cannot be used to compare effectiveness in different polymeric systems, since even polymer molecular weight can cause substantial changes in separation time between two systems made from the same monomers. However the laboratory tests are meaningful in terms of screening potential stabilizers.

The test used here is similar to those of Hughes and Brown, J. Appl. Polymer Sci., 7, 59 (1963) and Molau, J. Polymer Sci., A3, 1267 (1965).

EXAMPLE 10

TABLE B.—STABILIZATION OF POLYMER-SOLVENT SYSTEMS WITH GRAFT COPOLYMERS

| Graft polymer | Homo-polymers [1] | Conc. homo-polymers g./dl.[2] | Homo-polymers, g. (50%:50%) | Weight graft, g. | Time to demix, hrs. Control | Time to demix, hrs. Graft |
|---|---|---|---|---|---|---|
| Ex. 7a | PS&PMMA | 22 | 0.3 | 0.3 | 1.0 | 7.5 |
| Ex. 7b | PS&PMMA | 22 | 0.3 | 0.3 | 1.0 | 168.0 |
| ([3]) | PS'&PVA | 6 | 0.3 | 0.2 | 0.3 | 1.5 |

[1] PS—polystryene 43,000 M.W., PS'—182,000 M.W.; PMMA—poly(methyl methacrylate) 60,700 M.W. and PVA—poly(vinyl acetate) 120,000 M.W.
[2] Chloroform was used as the solvent for the PS-PMMA system and benzene was used as the solvent for the PS'-PVA system.
[3] Copolymer of Test No. 8 (Example 6) grafted with styrene at 85° C. for 16 hours in a weight ratio of 1:2. (see Table A).

EXAMPLE 11

Additional "demixing" tests were run on the graft copolymer derived from the backbone polymer (Ex. 7a) using chloroform as the solvent. A 15 g./dl. solution of this unfractionated graft copolymer containing homopolymers formed in situ during the synthesis required 7 days to demix.

Equal volumes of equal concentration (8 g./dl.) of this (7a) graft copolymer, polystyrene and poly-(methyl methacrylate) required 5 hours to demix.

Equal volumes of equal concentration (8 g./dl.) of the two homopolymers demixed in 0.33 hrs. the polystyrene and poly(methyl methacrylate) used in this test were different from those shown in Table B but the M.W. is unknown.

A particular utility for the stabilization effectiveness of the graft and graft-block copolymers of the invention is in the bonding of two layers of incompatible polymers. A layer, film or filament or sheet of polymer A, such as AB rubber, is coated with a film of a graft or graft-block copolymer of this invention, by melt or casting from solution; then a layer of polymer B, such as PVC or polyester, is cast onto the graft layer. The graft adheres the two layers of polymer A and B together. In another case a polystyrene and a polymethyl-methacrylate may be bonded together by a graft copolymer intermediate layer.

*Additional utility.*—Graft or graft-block copolymers may be used as polymer processing aids for lowering the processing temperature without encountering any incompatibility, bleeding, or separating of the additive copolymer.

With rigid PVC, good clarity and good impact properties may be obtained when using the graft or graft-block copolymers of this invention as processing aids. Lower processing temperatures with no decomposition of the PVC are permitted.

It has also been discovered that particular terpolymers of the defined peroxyester monomer I of this invention, are especially useful as agents for coupling polymeric materials to common reinforcing materials; for example, polyester resin to glass fiber, polybutadiene to clay, PVC to metal, and polystyrene to cellulosic materials.

The terpolymer is prepared by polymerizing an ethylenically unsaturated monomer, the defined peroxyester monomer I, said copolymerizable monomer capable of further reaction to provide pendant functional groups, such as hydroxyl or carboxyl. An illustrative example is the terpolymer obtained from styrene, di-t-butylperoxy fumarate, and maleic anhydride.

(4) Curing of unsaturated polyester resins

The curing process of the invention comprises heating, to a curing temperature for a time sufficient for the curing reaction to take place, (A) a curing amount of the peroxyester homopolymer or peroxyester copolymer as defined in Summary 1 and 2, (B) unsaturated polyester resin and (C) vinyl-type monomer.

The curing temperature is related to the time of cure desired—to a degree. The peroxyester polymers of the invention have a wide range of operability. Usual curing temperatures fall in the range of about +70° C. and about 200° C.

The vinyl-type monomer referred to in the curing process have the identical definition set forth in Summary 2. The most commonly used monomer are styrene itself and diallyl phthalate.

The term "unsaturated polyester resin" is to be given its broadest meaning of the polycondensation product of unsaturated dibasic acids and dihydric alcohols. Saturated dibasic acid may be present; also some tri-functional acids or alcohols may be present (Condensed Chemical Dictionary, 7th edition, Reinhold Publ. Co.).

Examples

In these examples the unsaturated polyester resin was the product of the listed reactants and had the physical properties given. The blend of resin and styrene had the given properties.

| Reactants | Moles |
|---|---|
| Maleic anhydride | 1.0 |
| Phthalic anhydride | 1.0 |
| Propylene glycol | 2.2 |
| Acid No. of Resin | 40 |

Blend
  Inhibitor—0.013%
  Added styrene monomer, percent of blend—33
  Viscosity (Brookfield No. 3 at 20 r.p.m.)—11–12 poises
  Specific gravity—ca. 1.14

EXAMPLE 12

Curing of resin with styrene-di(t-butylperoxy) fumarate copolymer

A styrene-di(t-butylperoxy) fumarate copolymer (Test No. 1) was compared to benzoyl peroxide and monomeric di(t-butylperoxy) fumarate in the curing of the resin on an equal active oxygen basis; BPO at 1.0% by weight. The results are given below.

| Temp., ° C. | Item | Benzoyl peroxide | Di(t-butyl-peroxy) fumarate | Styrene-DTBPF copolymer |
|---|---|---|---|---|
| 82 | Gel, min | 4.8 | ¹ >60 | 10.6 |
|  | Cure, min | 6.8 |  | 13.4 |
|  | Peak, ° F | 396 |  | 378 |
|  | Barcol | 38–48 |  | 35–45 |
| 121 | Gel, min | 1.4 | 5.8 | 2.1 |
|  | Cure, min | 2.2 | 7.1 | 3.0 |
|  | Peak, ° F | 440 | 435 | 421 |
|  | Barcol | 40–50 | 40–50 | 40–50 |

¹ The reaction was discontinued after one hour since the gel stage was not attained.

It is of interest that the peroxyester copolymer is significantly more effective than the peroxyester itself at these mild conditions.

EXAMPLE 13

The homopolymer of Example 1 was compared to benzoyl peroxide in curing the above described resin, at equal active oxygen level (BPO, 1.0% by weight; homo-, 0.81%).

| Temp. ° C. | Item | BPO | Homopolymer |
|---|---|---|---|
| 82 | Gel, min | 5.7 | 2.3 |
|  | Cure, min | 7.8 | 4.2 |
|  | Peak, ° F | 393 | 389 |
|  | Barcol | 40–50 | 40–50 |
| 121 | Gel, min | 1.3 | 1.3 |
|  | Cure, min | 2.1 | 2.1 |
|  | Peak, ° F | 435 | 435 |
|  | Barcol | 40–50 | 40–50 |

Example 13 shows the homopolymer to be an unexpectedly efficient low temperature curing agent.

(5) Free radical initiated polymerization

The polymerization process of the invention comprises using peroxyesterhomopolymer as defined in Summary 1 or peroxyestercopolymer as defined in Summary 2 as the initiator in the polymerization of ethylenically unsaturated compound capable of being polymerized by free radical initiation. The vinyl-type monomers and conjugated dienes, as previously defined, are especially suitable monomers for this process.

The initiator of the invention is effective under all conditions and procedures conventionally used.

EXAMPLE 14

Initiation of styrene polymerization with styrene-di(t-butylperoxy) fumarate copolymer A styrene-di(t-butylperoxy) fumarate copolymer (Test No. 1) was compared to benzoyl peroxide in a styrene bulk polymerization in a calibrated dilatometer at 85° C. on an equal active oxygen basis. The data are summarized below.

|  | BPO | Peroxyester copolymer |
|---|---|---|
| Half-life, hrs | 2.15 | 7.7 |
| Kd, hr.⁻¹ | 0.32 | 0.09 |
| Rates, m./l. min.: |  |  |
| Initial | 16.1×10⁻³ | 8.46×10⁻³ |
| 5% | 14.6×10⁻³ | 7.65×10⁻³ |
| 10% | 13.5×10⁻³ | 7.53×10⁻³ |

Taking into account the difference in half-life, the peroxyester copolymer is rated an exceptional initiator for this polymerization.

Thus having described the invention what is claimed is:

1. A copolymerization process to produce a copolymer containing a pendant peroxyester group which comprises self-initiating polymerization at a temperature of from about 30° to about 70° C. of a di-peroxyester monomer in the presence of an ethylenically unsaturated monomer capable of being polymerized by free radical initiation, said di-peroxyester having the formula $$P-(R_1)_n-[A]-(R_2)_m-P$$

where (a) [A] is the radical [—CH=CH—] or

(b) P is the radical

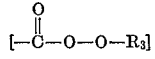

or

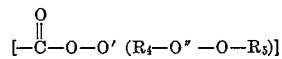

(c) $m$ and $n$ are zero or 1;
(d) $R_1$ and $R_2$ are alkylene radicals having 1–6 carbon atoms;
(e) $R_3$ is the radical lower t-alkyl, cycloalkyl at a t-carbon atom, cycloalkyl-lower-t-alkyl, or ar-lower-t-alkyl;
(f) $R_4$ is a radical having a t-carbon atom joined to peroxy oxygen O' and a t-carbon atom joined to peroxy oxygen O", said radical $R_4$ being alkylene, alkenylene, or alkynylene having 3–12 carbon atoms;

(g) $R_5$ is the radical H, lower t-alkyl, ar-lower t-alkyl, lower acyl, or lower carbonate.

2. The process of claim 1 wherein $m$ is zero.

3. The process of claim 1 wherein said monomer is di(t-butylperoxy) fumarate.

4. The process of claim 1 wherein said polymerization is carried out in a liquid inert cooling medium.

5. The process of claim 4 where said cooling medium is an inert organic liquid solvent for said monomer.

6. The process of claim 4 wherein said cooling medium is an aqueous medium.

7. The process of claim 1 wherein said unsaturated monomer is a vinyl monomer.

8. The process of claim 7 where said vinyl monomer is styrene.

9. The process of claim 1 wherein said unsaturated monomer is a conjugated diene.

10. The process of claim 9 wherein said diene is butadiene.

11. A copolymerization process comprising the self-initiated bulk copolymerization of di(t-butylperoxy) fumarate and styrene in a weight ratio of 1:5, at 60° C. for 16 hours to produce a peroxyester copolymer having 1.10% active oxygen content.

12. The copolymer produced by the process of claim 1.

13. The copolymer produced by the process of claim 1 where $m$ and $n$ are each zero, said copolymer being characterized by 2 pendant peroxyester groups being adjacent each other.

14. The copolymer produced by the process of claim 11.

15. In a polymerization process wherein a free radical initiated polymerization is carried out in the presence of added free radical affording initiator compound, the improvement which consists essentially of using as said initiator the product defined by claim 12.

16. The process of claim 15 wherein the monomer charged to said polymerization is vinyl monomer or conjugated diene.

References Cited

FOREIGN PATENTS 2,997,793    8/1965    Netherlands.

OTHER REFERENCES

Yurzhenko and Fedorova; Synthesis of Peroxide Esters of Aliphatic Dibasic Acids, pp. 689–691; Journal of Organic Chemistery of the U.S.S.R., vol. I, January–April.

JOSEPH L. SCHOFER, Primary Examiner

J. KIGHT, Assistant Examiner

U.S. Cl. X.R.

252—434: 260—29.1, 33.8, 34.2, 45.7, 78.4, 80.81, 82.1, 82.3, 85.5, 85.7, 86.1, 86.3, 86.7, 87.1, 88.1, 88.2, 92.8, 93.5